Feb. 26, 1946. A. LUXEM 2,395,788
WARMING OVEN
Filed Dec. 20, 1941
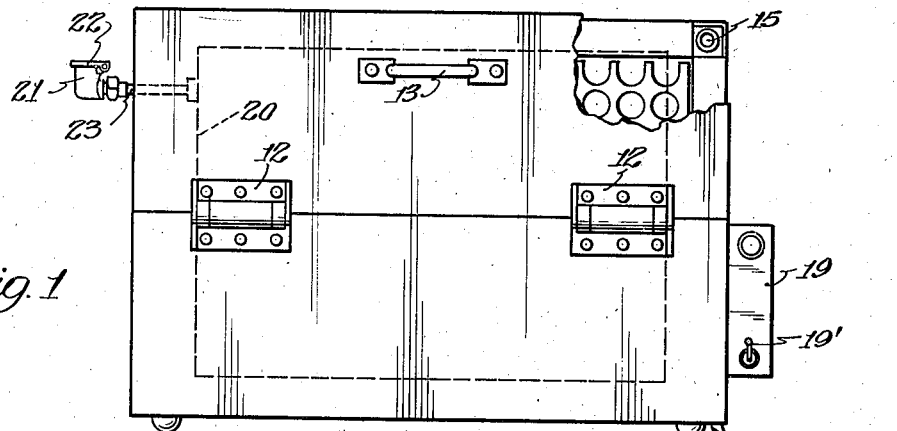
*Fig. 1*
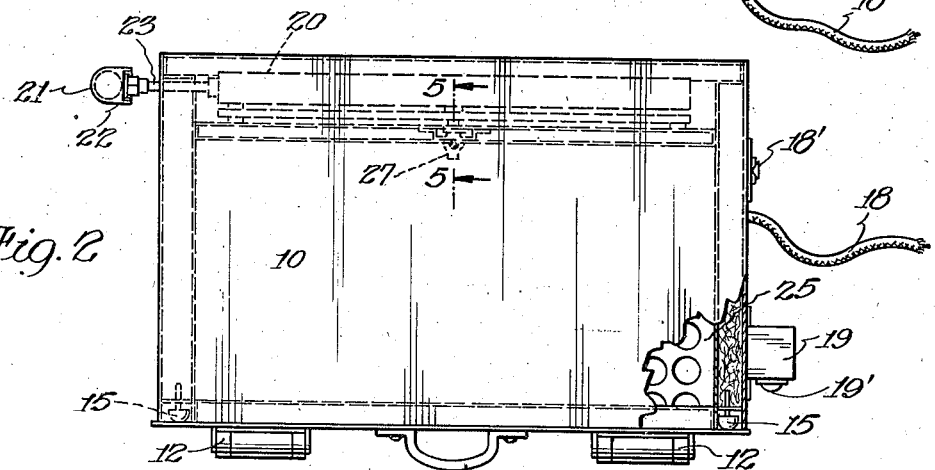
*Fig. 2*
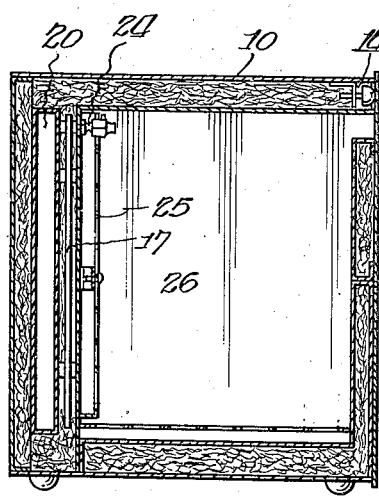
*Fig. 3*
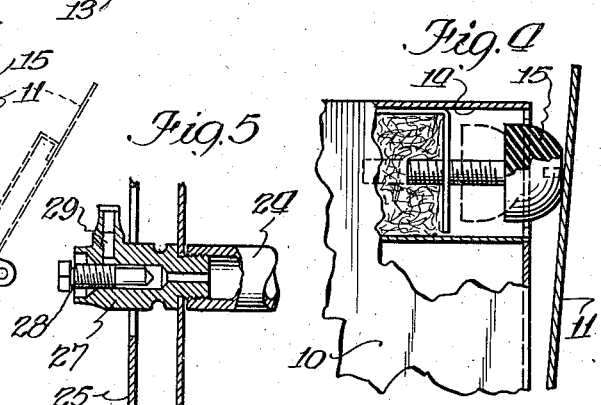
*Fig. 4*
*Fig. 5*
Inventor:
Arthur Luxem
By: Brayton Richards
Attorney.

Patented Feb. 26, 1946

2,395,788

UNITED STATES PATENT OFFICE 2,395,788

WARMING OVEN

Arthur Luxem, Chicago, Ill.

Application December 20, 1941, Serial No. 423,780

1 Claim. (Cl. 126—198)

The invention relates to improvements in Warming ovens especially adapted for use in warming rolls for restaurant or domestic use and has for its primary object the provision of an improved warming oven of the character indicated which is of simple construction and highly efficient in use.

A further object of the invention is the provision of a warming oven of the character indicated constructed and arranged to maintain the humidity in the oven chamber substantially the same as that of the food being warmed.

Other objects will appear hereinafter.

The invention consists of the combinations and arrangements of parts hereinafter described and claimed.

The invention will be best understood by reference to the accompanying drawing forming a part of the specification and in which Fig. 1 is a front view of a warming oven embodying the invention;

Fig. 2 a top plan view of the same;

Fig. 3 a transverse vertical section of the same;

Fig. 4 an enlarged detailed vertical section taken through an upper corner of the construction; and Fig. 5 an enlarged partial detailed section taken substantially on line 5—5 of Fig. 2.

The embodiment of the invention illustrated in the drawing comprises an enclosure 10 which is preferably provided with heavily insulated walls and at its upper front portion with a forwardly swinging door 11 which is mounted at its bottom upon spring hinges 12 which permit of such swinging but at the same time normally press said door toward its closed position. The door 11 is provided with a suitable handle 13 to facilitate the opening of the same.

At the tops of the sides of the door frame, pockets or recesses 14 are provided and rubber bumpers or stops 15 are adjustably arranged as indicated in these pockets on threaded stems whereby said bumpers may be readily adjusted into and out of said pockets to limit adjustably the closing positions of the door 11 as will be readily understood. By this arrangement provision is made whereby the door 11 may be completely closed or the bumpers 15 may be adjusted to limit the closing movement thereof to cause a ventilating opening for the oven chamber as indicated in Fig. 4, and whereby suitable ventilation is provided so that rolls or the like will be kept in the oven chamber at the proper temperature and moisture consistency for use on the table. By hinging the door at its bottom and extending the same to the top of the oven the greatest extent of ventilating opening is provided at the top whereby a proper circulation of air is induced.

The embodiment of the oven shown in the drawing is heated by a suitable electric heating element 17 supplied with current through the cable 18 and a proper thermostat 19, and switch 19' are also provided for controlling the heat, these parts being old and well-known for the purpose and constituting no part of the present invention, except in so far as they cooperate with the other parts of the construction.

A narrow rectangular water boiler 20 is arranged as shown immediately to the rear of the heating element 17 and a filling cup 21 having an upwardly swinging spring held cover 22 is connected by pipe 23 with the upper portion of the boiler 20 and whereby water may be supplied thereto and a safety steam escape provided to prevent the accumulation of undue pressure in the boiler. A steam escape pipe 24 leads from the upper portion of the boiler 20 through a perforated baffle plate 25 at the rear of the oven chamber 26 and a steam escape valve casing 27 is provided at the forward end of said pipe 24. The valve casing 27 is provided with an adjustable valve 28 and an escape orifice 29, whereby the amount of steam escaping from the boiler 20 may be regulated as desired. By this arrangement the heating element 17 serves the double purpose of heating the oven chamber 26 and also the water in the boiler 20 to supply steam to said oven chamber. By regulating the amount of steam escaping through the valve head 27 the humidity in the oven chamber may be readily adjusted to that of the food being warmed so that there will be no material evaporation of moisture from the food and the food will thereby be maintained at its normal humidity or moisture content and thus its original qualities preserved until consumption thereof.

While I have illustrated and described the preferred form of construction for carrying the invention into effect, this is capable of variation or modification without departing from the spirit of the invention. I therefore do not wish to be limited to the precise details disclosed but desire to avail myself of such variations or modifications as fall within the scope of the appended claim.

I claim:

A warming oven comprising an enclosure having a door hinged at the bottom and extending to the top of said enclosure and spring pressed toward closing position, there being pockets provided at the tops of the sides of the door frames; and door stops in the form of bumpers mounted on threaded stems adjustable into and out of said pockets.

ARTHUR LUXEM.